(12) United States Patent
Hoarau et al.

(10) Patent No.: US 9,307,114 B2
(45) Date of Patent: Apr. 5, 2016

(54) ANALOG BACKUP OF DIGITAL IMAGES AND IMAGE RESTORATION THEREFROM

(75) Inventors: Eric Hoarau, San Francisco, CA (US); Ingeborg Tastl, San Mateo, CA (US); Nathan Moroney, Palo Alto, CA (US); Anthony G. Stieber, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2018 days.

(21) Appl. No.: 12/358,649

(22) Filed: Jan. 23, 2009

(65) Prior Publication Data

US 2010/0188704 A1 Jul. 29, 2010

(51) Int. Cl.
*G06F 3/12* (2006.01)
*H04N 1/32* (2006.01)
*H04N 1/00* (2006.01)

(52) U.S. Cl.
CPC ....... *H04N 1/32133* (2013.01); *H04N 1/00196* (2013.01); *H04N 2201/3225* (2013.01); *H04N 2201/3226* (2013.01); *H04N 2201/3252* (2013.01); *H04N 2201/3253* (2013.01); *H04N 2201/3259* (2013.01); *H04N 2201/3269* (2013.01); *H04N 2201/3271* (2013.01)

(58) Field of Classification Search
None
See application file for complete search history.

(56) References Cited

U.S. PATENT DOCUMENTS

| | | | |
|---|---|---|---|
| 5,543,940 A | 8/1996 | Sherman | |
| 5,706,457 A | 1/1998 | Dwyer et al. | |
| 5,796,874 A | 8/1998 | Woolfe et al. | |
| 6,118,556 A * | 9/2000 | Yamamoto et al. | 358/487 |
| 6,304,345 B1 | 10/2001 | Patton et al. | |
| 2006/0103887 A1* | 5/2006 | Enomoto et al. | 358/296 |
| 2006/0158672 A1* | 7/2006 | Kondo | 358/1.9 |

\* cited by examiner

*Primary Examiner* — Vincent Rudolph
*Assistant Examiner* — John Wallace
(74) *Attorney, Agent, or Firm* — Fabian VanCott

(57) ABSTRACT

An apparatus for backing up a digitally stored image includes a substrate on which the image and digital restoration data corresponding to the digitally stored image are printed on the substrate. The apparatus may be scanned to restore the image printed thereon to its original digital form.

5 Claims, 9 Drawing Sheets

ANALOG BACKUP OF DIGITAL IMAGES AND IMAGE RESTORATION THEREFROM

BACKGROUND

Images are used and stored for a variety of purposes. For example, many people use photographic images to provide a visual remembrance of people, places, objects, or events in their personal or business associations. In other examples, photographic images may be used to provide evidence of an event or to illustrate a presentation. Fabricated images, such as logos and computer artwork, are also used for a variety of commercial and personal ends.

With the modern prevalence of personal computers and digital media, many people choose to store personal photos and other images digitally using media such as hard drives, flash drives, optical disks, and online storage services. While a digital file can conveniently preserve original image data and metadata of an image, the inherent physical characteristics of the physical media used to store digital files or other hardware failures may introduce errors or corruption into the digital file over time. For example, digital data stored on a magnetic hard disk or an optical disk may have a reliable lifespan of as few as 5-6 years. Other potential detrimental issues in digital image storage include, but are not limited to, system or file format obsolescence, viruses, natural disasters, theft and simply user errors. As such, combating digital image loss is typically a proactive effort which requires explicit, costly, and often time consuming actions on a regular basis.

One alternative to the digital storage of images is that of analog storage of the images on a physical medium. For example, analog storage of an image may include a printed copy of the image on a paper substrate. Printed analog images may be directly viewed and enjoyed by the image owner without a computer or other display device. Moreover, analog images may be converted into digital images through scanning and/or photographic methods, thereby making analog images a viable form of backup storage for digital images. However, printed images are generally susceptible to the detrimental effects of aging. Particularly, the inks used to print analog images may break down chemically with exposure to light, environmental contaminants and the passage of time, resulting in fading and color loss.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As described above, the inherent physical characteristics of the physical media used to store digital files or other hardware failures may introduce errors or corruption into the digital files over time. Therefore, it may be desirable to maintain an analog printed backup of digitally stored image files. However, the shading and saturation in printed images tend to deteriorate over time as colorants in the inks used to print the images break down chemically. Consequently, it may also be desirable to create a form of analog printed image backup that enables an easy image reconstruction in spite of ink fade and decomposition.

To accomplish these and other goals, the present specification describes methods and systems of enhanced digital image backup and restoration wherein color reference data is printed together with an analog image. The color reference data may be used to reconstruct the original image colors when restoring a digital image from the analog image.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
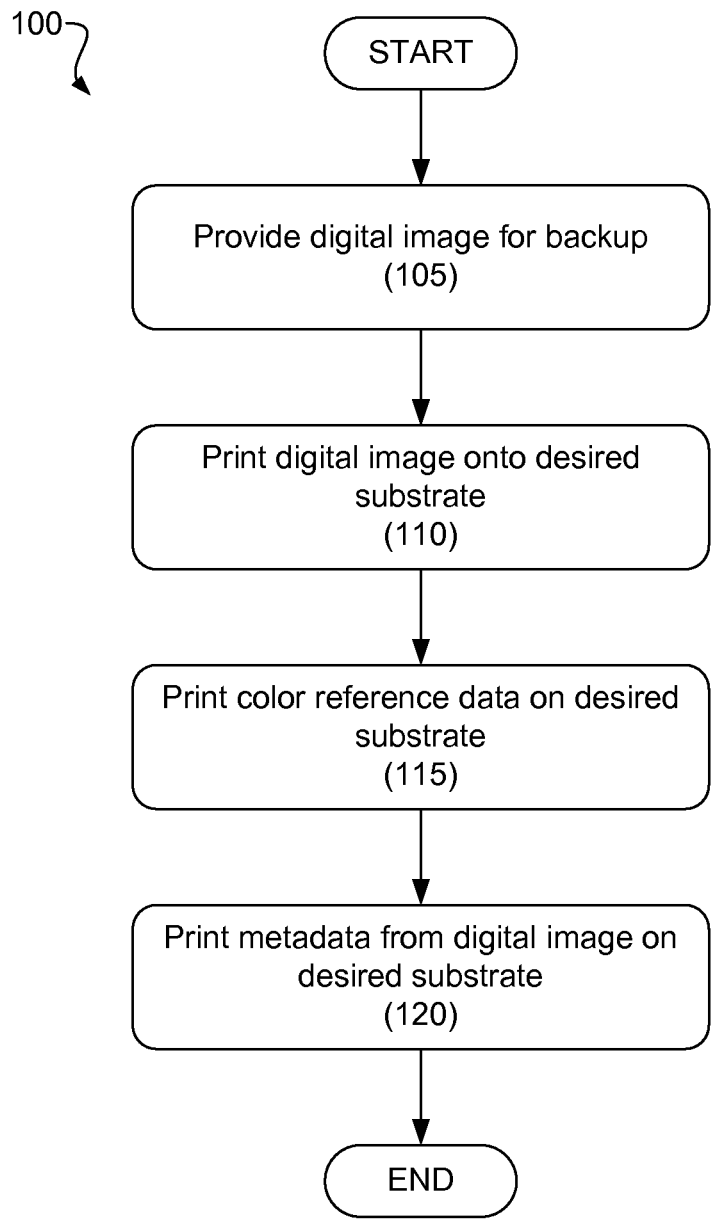
FIG. 1 is a flow diagram of an illustrative method of digital image backup, according to one exemplary embodiment of the principles described herein.

FIG. 1 shows an overview flow diagram of an illustrative method (100) of digital image backup. In certain embodiments, at least some steps of the method (100) may be executed by one or more computers or other processing elements, such as one or more embedded devices.

The method (100) includes providing (step 105) a digital image for backup. The digital image may be stored on a computer readable medium such as a hard disk, flash memory, random access memory, an optical disk, or any other computer readable medium that may suit a particular application of the principles described herein. The digital image is then printed (step 110) to a desired substrate to create an analog image corresponding to the digital image. For example, the digital image may be printed by a computer that stores the digital image sending the digital image to a printer in communication with the computer according to techniques well-known in the art.

Color reference data is also printed (step 115) onto the desired substrate. The color reference data may include a fiducial that provides a way to track, for example, fading of colors in the printed image over time. Thus, the color reference data may include color patches, including, but not limited to, at least one color patch configured to match a specific color in said image; at least one color patch configured to match an average color used in said image; a plurality of color patches corresponding to an even sampling of a predetermined color space; a plurality of color patches corresponding to an algorithmic sampling of a predetermined color space; and a plurality of color patches corresponding to a custom and/or user-selected sampling of a predetermined color space.

In certain embodiments, the color reference data may include a set of color patches sampling the color space of the image (e.g. sRGB) with the corresponding color space values (e.g. 255/0/0), printed next to each of the color patches. Additionally or alternatively, values for each of the color patches may also be specified in a device independent way using, for example, the CIELab color space.

In certain embodiments, the numbered color values specified for each of the color patches may be equal to the digital values of the color patches before the file is printed. Additionally or alternatively, some or all of the numbers may correspond to the colorimetry of the printed patches (either prognosticated by using an ICC printer profile, or measured in a pre-processing step). In the first case the reconstructed image will correspond to the original digital file before printing, versus in the second case, where the reconstructed image will corresponds to the printed image.

The method (100) also includes printing (step 120) metadata from the digital image on the desired substrate. Metadata is data that is encoded with a digital image, but not a visual component of the image itself. For example, digital image metadata may include, but is not limited to a file name, date, one or more tags, GPS location, compass orientation of the lens, inclination of the lens, camera shutter speed, camera f-number, camera focal length, camera flash data, and image color space data (e.g. sRGB or Adobe RGB). Any portion or all of an image's metadata may be printed (step 120) on the desired substrate in conjunction with the image and the color reference data to provide an analog backup of the image metadata. In certain embodiments, the metadata may be printed in a standard font that provides for relatively easy interpretation by optical character recognition (OCR) software upon scanning.

Following completion of these steps, a suitable analog backup of the digital image may have been completed. In certain embodiments, one or more digital images together with their corresponding color reference data and metadata may be printed together on the desired substrate. In some examples, two or more printed digital images may share printed color reference data. Alternatively, each printed digital image may include its own set of printed color reference data. The printed images may include sufficient white space around them to facilitate both image protection and easy scanning, as well as serve an aesthetic purpose.

The printed images may serve the dual purpose of providing an analog backup of the digital images and allowing a user or owner access to the images without having to retrieve the images electronically. For example, several digital images may be printed together with their corresponding color reference data and metadata and bound into an album that a user may browse.

In certain embodiments, the images may be bound into a book or pamphlet to allow one or more users to view and enjoy the images as an album. The information about the image includes various pieces of data that may help with reconstruction of the original digital image despite whatever fading or other aging effects the printed image has experienced.

After years of fading a user may desire to restore one or more faded images to their original appearance. To do so, the user may scan the printed image(s) and reconstruct the original image, either automatically or manually, from the scanned image and the corresponding color reference data and metadata printed with the images(s), as will be described in more detail below. The user will then have a finished digital image that resembles the original digital image before it was printed and faded.

Figure 2:
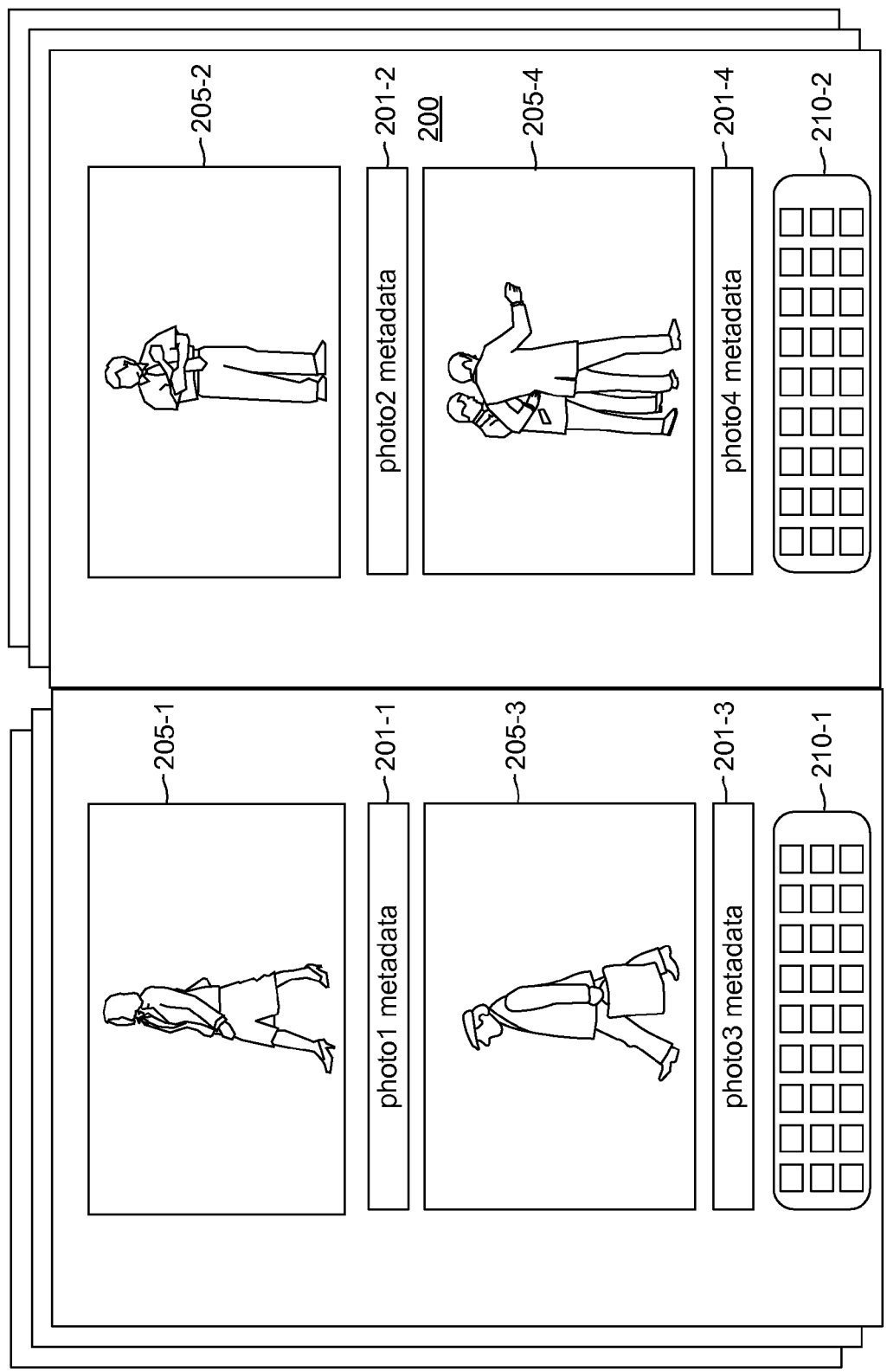
FIG. 2 is a diagram of an illustrative analog backup of a digital image printed on a substrate, according to one exemplary embodiment of the principles described herein.

FIG. 2 shows one possible embodiment of a page layout for printed analog backup images on one or more sheets of a substrate (200) according to the method (100, FIG. 1) described above. In the present example, the layout includes image metadata (201-1 to 201-4) printed directly beneath each printed image (205-1 to 205-4) and a set of reference color patches (210-1, 210-2) printed at the bottom of the page.

In certain embodiments, digital test patterns based on International Standard for Organization (ISO) standards may be incorporated within the reference color patches (210-1 to 210-4). These ISO standards are well-known in the art and may be incorporated into the printed image as may best suit a particular application of the principles herein while maintaining an acceptable aesthetic appearance such that the image can be viewed and enjoyed by the user without distraction.

Additionally, the metadata (201-1 to 201-4) that can be printed with the image may include, but is not limited to, one or more of the following data fields: file name, date, tags, and GPS location, compass orientation of the lens, inclination of the lens, camera shutter speed, camera f-number, camera focal length, camera aperture setting, camera flash settings, and camera color space settings. In the present example, the metadata (201-1 to 201-4) is printed in a standard font so as to be read easily by various OCR (optical character recognition) algorithms.

The color patches (210-1, 210-2) of the present example may include a color target of 27 color patches evenly sampling the sRGB color space or another applicable color space. Alternatively, any other number of color patches or color sampling may be used, as may best suit a particular application of the principles described herein. These color patches (210-1, 210-2) may be used to track ink fade in the printed images (205-1 to 205-4). Each of the color patches (210-1, 210-2) may include accompanying text corresponding to the color space (e.g., sRGB) values of the patches (210-1, 210-2). As the colors in the printed images (205-1 to 205-4) fade, the color patches (210-1, 210-2) should fade in a similar manner. When reconstructing the original digital images from the printed images (205-1 to 205-4), the color fading of the color patches can be used to create a transformation function that will restore the colors in the faded image close to their digital original appearance. In certain embodiments, it may not be necessary to print a set of these general color patches (210-1, 210-2) with each image that is on the page. One set of color patches per page or even one per album may suffice.

Figure 3:
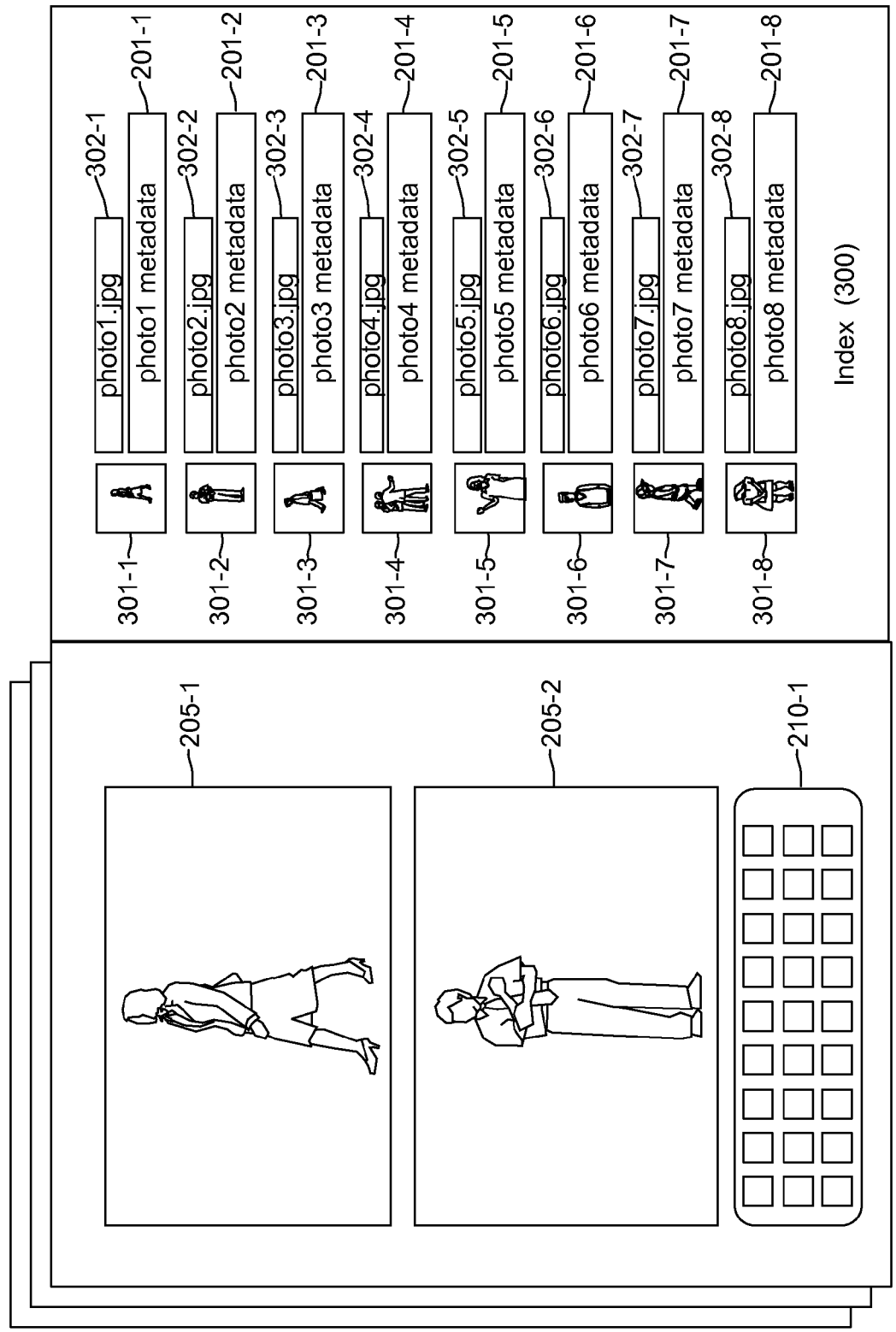
FIG. 3 is a diagram of an illustrative analog backup of a digital image printed on a substrate, according to one exemplary embodiment of the principles described herein.

FIG. 3 shows another possible embodiment of a page layout for printed analog backup images made from digital images according to the method (100, FIG. 1) described above. In the present example, a first portion of an album or other collection of images may be dedicated to printed images (205-1, 205-2) and color patches (210-1). Image-specific metadata (201-1 to 201-8) may be printed in an index (300) portion of the album. The metadata (201-1 to 201-8) can be associated with their corresponding images (205-1, 205-2) through, for example, printing miniaturized versions (301-1 to 301-8) of the corresponding images (205-1, 205-2) (i.e., thumbnails) next to the metadata (201-1 to 201-8) printed in the index (300). Additionally or alternatively, an image name or number (302-1 to 302-8) may be printed with each of the printed images (205-1, 205-2) in the album, and again with associated metadata (201-1 to 201-8) in the index (300). One advantage of the indexed metadata approach to image backup described in the present example is that of making the area around the printed images (205-1, 205-2) less cluttered, thereby making the viewing of the images (205-1, 205-2) easier and more pleasing.

Figure 4:
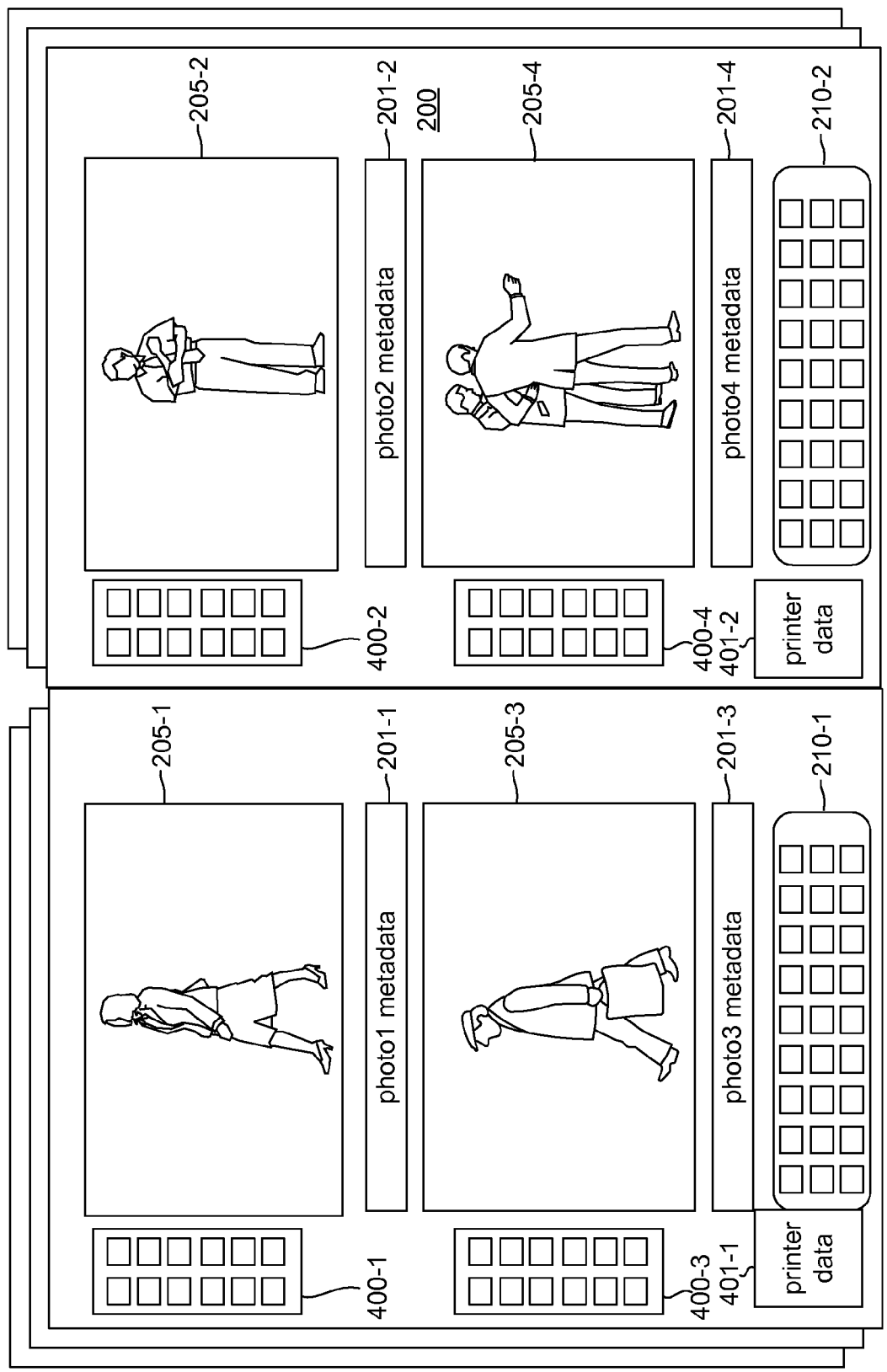
FIG. 4 is a diagram of an illustrative analog backup of a digital image printed on a substrate, according to one exemplary embodiment of the principles described herein.

FIG. 4 shows another possible embodiment of a page layout for printed analog backup images made from digital images according to the method (100, FIG. 1) described above. The page layout shown is similar to that described in connection with FIG. 2, however the page layout of FIG. 4 includes an additional set of color patches (400-1 to 400-4) printed together with each printed image (205-1 to 205-4) in addition to the general color patches (210-1, 210-2) printed at the bottom of each page. These additional color patches (400-1 to 400-4) may correspond to specific colors present in an individual image and may be helpful for tracking and inverting color fading in specific images. These custom color patches (400-1 to 400-4) may be useful in reconstructing images manually. For example, a user may use the custom color patches (400-1 to 400-4) as a reference to recolor one or more specific portions of the image (e.g., the red shade of a car, the green shade of grass, or a blue shade of the sky). As such, the custom color patches (400-1 to 400-4) may include specific colors in the image that are important to the user such as memory colors.

Additionally or alternatively, printing information (401-1, 401-2) may be included with the images. The printing information may include, for example, data such as the specific type of printer used, the specific ink types used by the printer, and the specific medium to which the images were printed. Different printers use different methods of printing and therefore may fade differently. Different inks also fade differently, thus it may be useful to know what ink types were used to print the image. In addition, the medium to which the images were printed may affect the way the image fades over time. Therefore, storing these printing variables may be very useful during the reconstruction process. Although the present example shows printing information (401-1, 401-2) printed on every page, it may not be necessary in some embodiments to have this information printed on every page. Accordingly, the printing information may be printed less frequently (e.g., once per album) in these embodiments.

Figure 5:
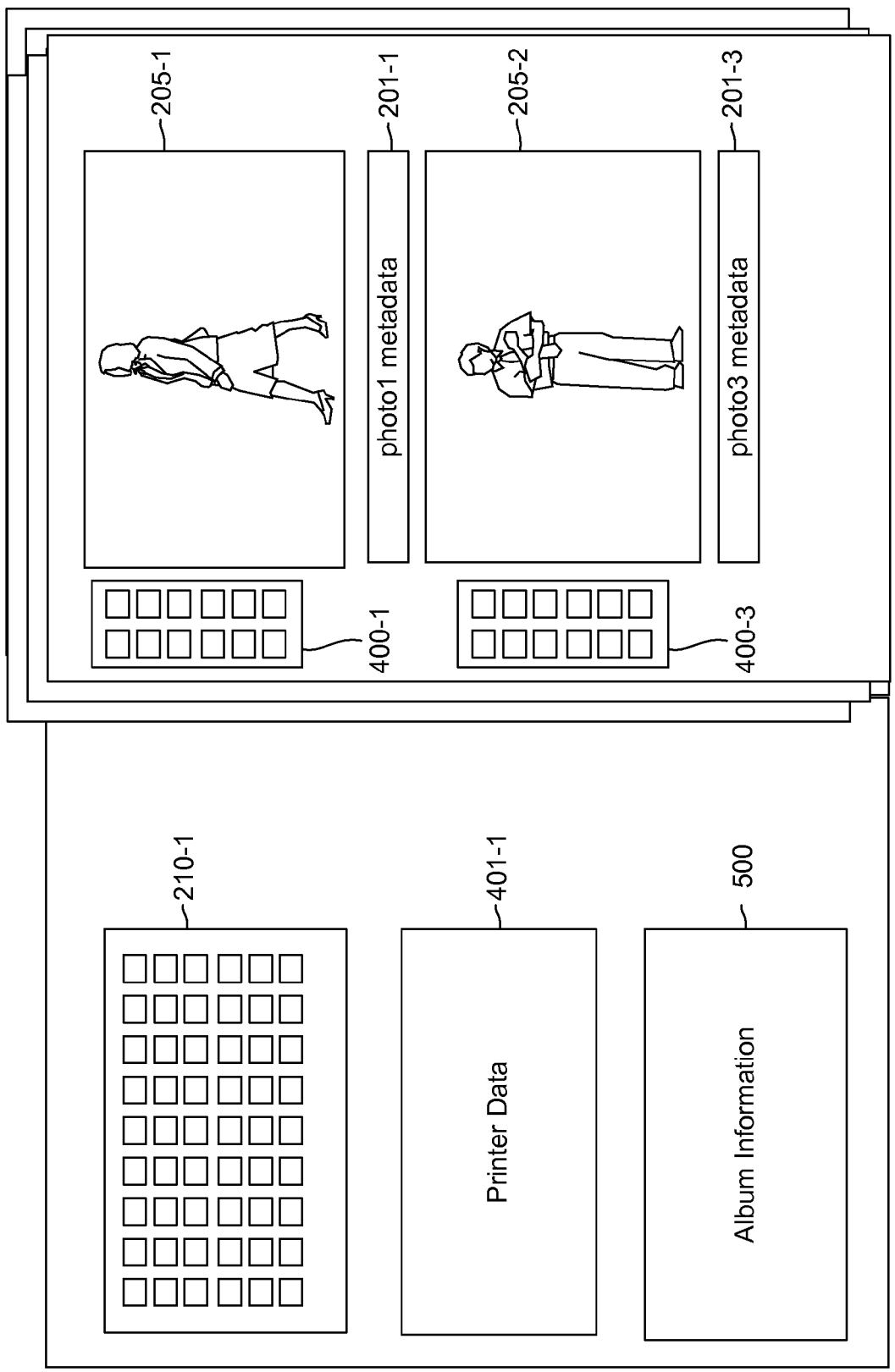
FIG. 5 is a diagram of an illustrative analog backup of a digital image printed on a substrate, according to one exemplary embodiment of the principles described herein.

FIG. 5 shows yet another possible embodiment of a page layout for printed analog backup images made from digital images according to the method (100, FIG. 1) described above. In the embodiment shown in FIG. 5, reference color patches (210-1, 210-2) are printed only once at the beginning or end of an album. For example, a user may create a personalized album to which one or more additional pages is added automatically that contains the color patches (210-1, 210-2) and any other suitable backup data, such as image metadata.

Such embodiments may be used if it is assumed that an album will be stored in a manner that will allow all the pages to experience similar fading. In certain embodiments, a larger available area at the beginning or end of an album may allow for the inclusion of more color patches, thereby resulting in a better reconstruction of the original image. The printing information (401) may also be printed with the color patches (210-1, 210-2) on only one page. This may be possible in embodiments where the entire album was printed with the same printer, ink, and printing medium. As shown, the color patches (210-1, 210-2) and printing information (401) of the present embodiment are printed in the front of the album, before all the printed images (205-1, 205-2). Alternatively, the color patches (210-1, 210-2) and printing information (410) may be printed as an appendix or in any other location of the album that may suit a particular application. In certain embodiments, the page containing the color patches (210) and the printing information (410) may also contain additional album information (500) including, but not limited to, a printing date, copyright information (where relevant), and the name(s) of album owner(s).

The embodiments described above and depicted in the figures show various elements of the printing layout and method. It may be possible to use any combination of these elements. The exact layout is not limited to the specific combinations as shown in the above mentioned embodiments and depicted figures.

In certain embodiments, the specific printing layout used for a particular application may be standardized for all users. In alternative embodiments, the specific printing layout used by a particular application may be determined by a user with the help of specialized software.

Figure 6:
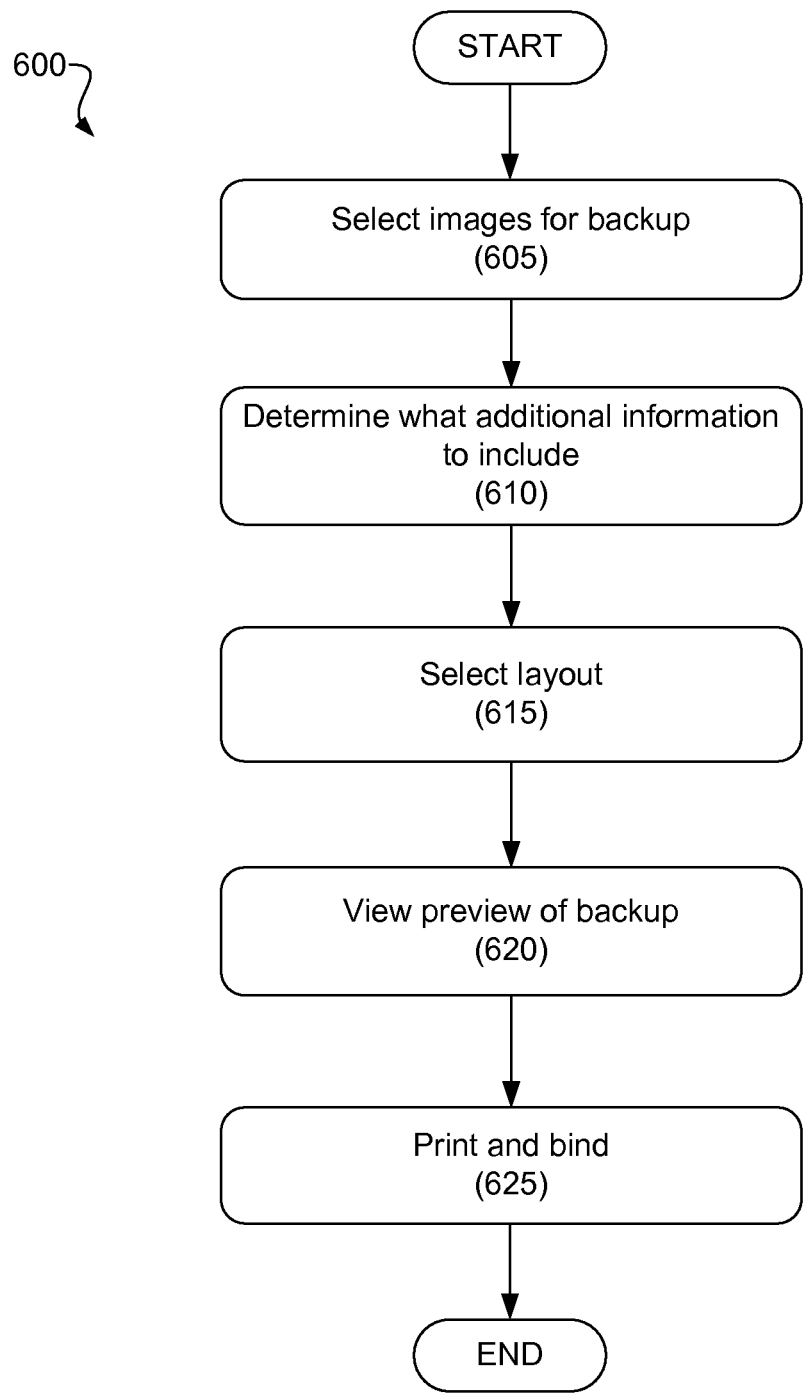
FIG. 6 is a flow diagram of an illustrative method of selecting a layout for an analog backup of a digital image, according to one exemplary embodiment of the principles described herein.

Referring now to FIG. 6, a flowchart of a computer-assisted method (600) of choosing a printing layout for analog backup of digital images is shown. The method (600) may be performed by, for example, a user of a personal computer according to prompts from software running on the personal computer.

The method (600) includes selecting (step 605) digital images for backup (600). These digital images may be stored on the hard drive of the computer running the software or in some other location accessible to the computer. The program may then allow the user to determine (step 610) what additional information to include with the analog backup of the images. This additional information will typically include color reference information, such as a standard set of color patches, and image metadata. The user may choose the type and size of the color reference information, and which portions of the image metadata to include. Some users may choose to have all available metadata printed. Other users may want to limit this metadata so as to save more space and possibly allow for more images per page. Additionally, in certain embodiments the user may choose to include printing and/or album information with the printed images. The user can also select the size of the printed image which will affect the resulting size of the reconstructed digital image (a 4"×6" printed image per page will result in ~2 MP image). For the most valued images, the user can print one larger image per page.

Once the user has decided what additional information to include with the printed images, an exact layout may be selected (step 615) either from suggestions made by the software or a manual arrangement by the user. The program may place some restrictions on some user decisions so as to make it easier for the scanner to scan the data when it comes time to restore the images.

After all these decisions have been made, the software may then allow the user to view (step 620) a preview of the final backup product. Upon viewing (step 620) the preview the user can decide whether to proceed or make additional changes to the layout. The analog backup of the digital printed image(s) may then be printed and bound (step 625), for example using a printer in communication with the computer or a web service.

After many years it may have occurred that a user has lost or damaged his or her digital files. The user may then want to restore his or her printed images. During these years, the images may have been subject to fading due to various environmental conditions. The images may be scanned, along with the metadata and associated color patches. This newly acquired digital image can be easily reconstructed using the additional information from the metadata and color patches. Those skilled in the relevant art are able to develop the algorithms and processes to bring the colors back to their original. The images may then be printed out again. There are two main ways of restoring the image after it has been scanned. One embodiment would involve an automatic restoration. Another embodiment would involve a manual reconstruction.

There may be several different ways to automatically restore the digital image back to its original digital form. The colorimetry (e.g., CIELAB space values and/or scanner RGB space values) of the faded color patches may be measured with a scanner. These values may then be used to transform the scanned image back to the sRGB values of the original digital image using algorithms executed by the scanner or any other suitable software.

Figure 7:
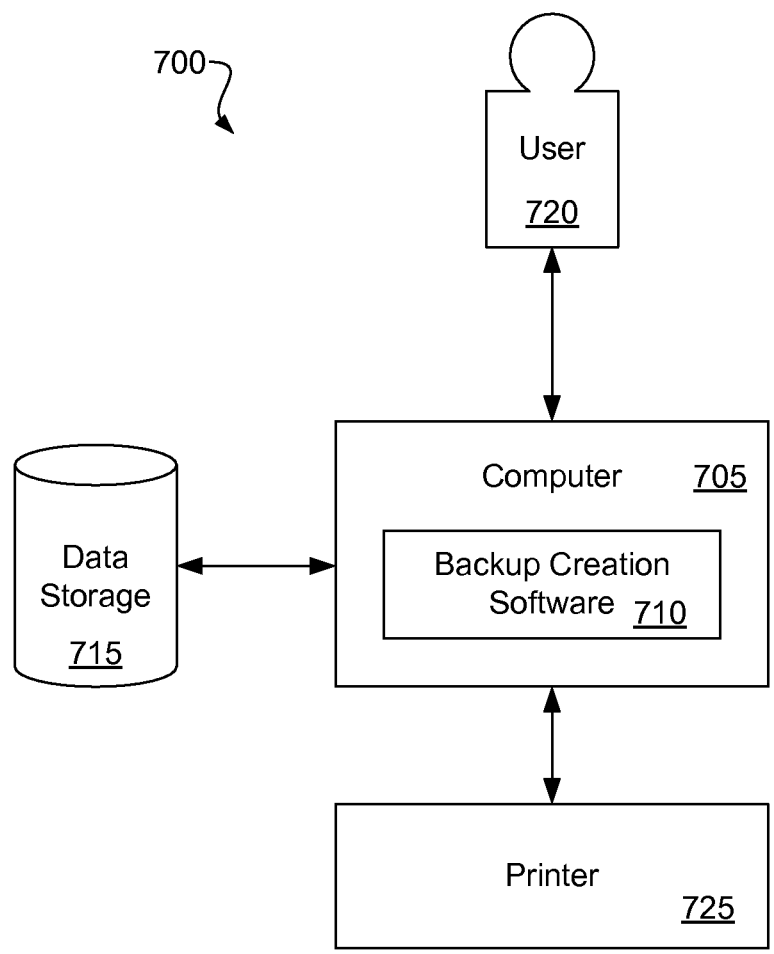
FIG. 7 is a block diagram of an illustrative system for configuring and printing an analog backup of a digital image, according to one exemplary embodiment of the principles described herein.

Referring now to FIG. 7, a block diagram is shown of an illustrative system (700) for configuring and printing an analog backup of at least one digital image in accordance with the principles described herein. The system (700) may be used, for example, in the execution of the methods (100, 600; FIG. 1, FIG. 6, respectively) described above.

The illustrative system (700) includes a computer (705) configured to execute backup creation software (710) and in communication with data storage (715). In the present embodiment, the computer (705) is a personal computer. However, in alternative embodiments the computer (705) may be any other suitable computing device, including, but not limited to, one or more web servers, any other remote computer, a mobile phone or other mobile device, a processor built into a printer or other peripheral device, a microcontroller, and combinations thereof. In certain embodiments, the data storage (715) may be an integral component of the computer (705), such as an integrated hard disk drive or random access memory. Additionally or alternatively, the data storage (715) may include any form of digital memory exterior to and in communication with the computer (705) that may suit a particular embodiment of the principles described herein.

The data storage (715) may be configured to store a plurality of digital images to which a user (720) has access. The user (720) may interact with the backup creation software (710) running on the computer (705) to select digital images in the data storage (715) to be backed up and a layout for the backup according to the method (600, FIG. 6) described above. For example, the backup creation software (710) may be implemented as one or more computer readable instructions embodied on one or more computer readable media. The computer (705) may be in communication with a local or remote (i.e. network printer or web service printing service) printer (725) that receives printing data from the computer (705) to print an analog backup of the selected digital images according to the method (100) described in with reference to FIG. 1 above. In certain embodiments, the entire process may be automated by an algorithm that selects the best images to use in an analog backup. Alternatively, the backup creation software (710) may be implemented as a semi-automated system that relies on information received from a user to select the images used in creating the analog backup.

Figure 8:
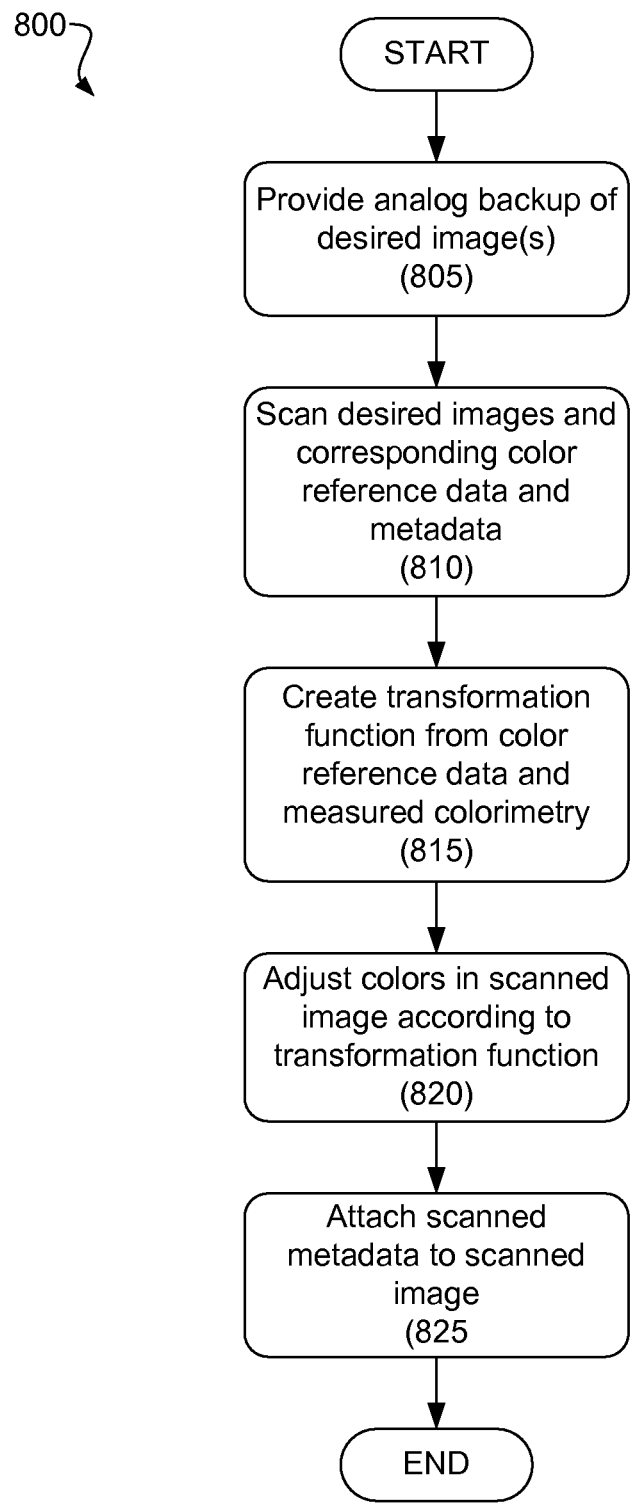
FIG. 8 is a flow diagram of an automatic restoration process of a digital image from an analog backup, according to one exemplary embodiment of the principles described herein.

FIG. 8 shows a flowchart diagram of an illustrative method (800) of restoring a digital image from an analog backup. In the method (800), an analog backup of one or more desired images, in accordance with the principles described above, is provided (step 805). The analog backup of the desired images, corresponding color reference data, and corresponding metadata are then digitally scanned (step 810) by a computing device. Most such computing devices and scanners contain proprietary algorithms that perform a re-rendering of the sensor data from the scanner to sRGB space, which is used to store digital images. Alternatively, in some devices raw scanner data can be accessed and converted into device independent CIELab values that are very close to the colorimetry provided by spectrophotometers. Either data set may be used for reconstruction purposes.

The scanning (step 810) may include creating a digital image file corresponding to each analog image scanned, converting any scanned printed metadata into a digital text format, and creating one or more digital image files corresponding to each instance of color reference data. Scanning may also include measuring the colorimetry of the images and the color reference data. The measured colorimetry of the color patches and the printed and retrieved reference color values may be used to create (step 815) a transformation function that, when applied to a scanned image, will restore it to its original appearance.

Any suitable algorithm may be used to create the transformation function and restore the scanned image to the coloring of the original digital image. For example, one possible restoration method could be implemented as a 3D scattered data interpolation. However, any 3D transformation that is defined by a set of 3D source data and a corresponding set of 3D destination data and that is capable of transforming a random point of the source gamut into a corresponding point of the destination gamut can be used. After the transformation is applied, the colors in the scanned image are adjusted (step 825), thereby restoring the scanned image to the original coloring of the original digital image.

Finally, scanned metadata may be attached (step 830) to their associated image(s). This way, the newly restored digital image may include all backed up elements of the original digital image.

In certain embodiments, the method (800) may be performed entirely by a scanner itself. Such embodiments would require the user to do nothing more than scan the analog backup, and store a digital image that has been automatically restored to its original colors.

In situations where automatic image reconstruction software is not available to a user, the user may still be able to scan desired analog backup images and use manual reconstruction methods to approximate the coloring in the original digital image using various image manipulation software that is commercially available (e.g., PHOTOSHOP, a product of Adobe). A simple reconstruction method may include performing an automatic color adjustment using on the scanned image using the image manipulation software. A more advanced method of reconstructing the original image may include correcting the colors locally on the image using the aforementioned color reference data, particularly color patches based on image-specific colors. Instructions for restoring the images manually may be included with the collection of images that are printed to the analog image database in the first place.

Figure 9:
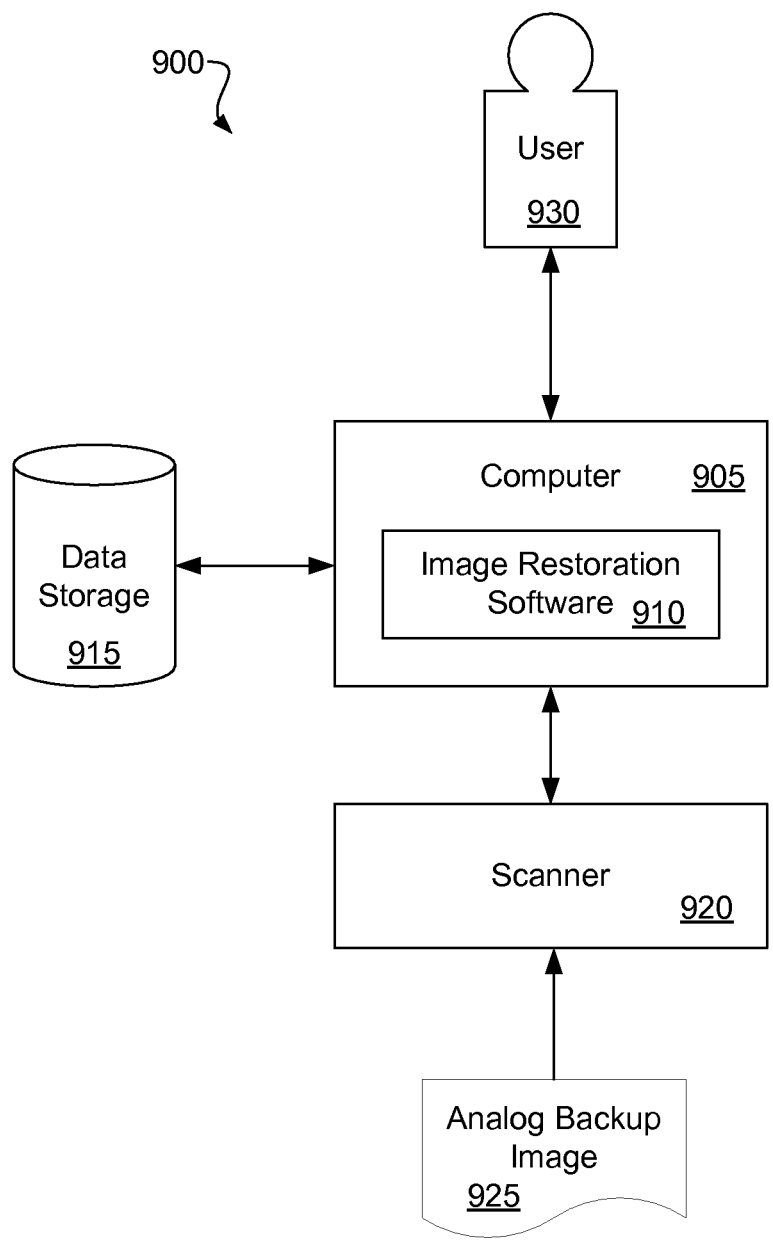
FIG. 9 is a block diagram of an illustrative system for automatically restoring a digital image from an analog backup, according to one exemplary embodiment of the principles described herein.

Referring now to FIG. 9, a block diagram is shown of an illustrative system (900) for restoring a digital image from an analog backup, in accordance with the method (800, FIG. 8) described above. The illustrative system (900) includes a computer (905) configured to run image restoration software (910). For example, the image restoration software (910) may be implemented as a series of computer-readable instructions embodied on one or more computer-readable media.

The computer (905) is in communication with data storage (915) that may be an integral component of the computer (905), or alternatively, independent and/or remote from the computer (905). The computer is also in communication with a scanner (920). In certain embodiments, the computer (905) may be a processor included with a scanner (920) as described above. In alternate embodiments, the computer (905) and the scanner (920) may be physically separate devices. For example, the computer (905) may be a personal computer that is in communication with the scanner (920) through a peripheral cord, or a wired or wireless network. In alternate embodiments, the scanner (920) may be in communication with a personal computer which then forwards the scanned data over a network to a remote computer (905) running the image restoration software (910), such as a web server.

The image restoration software (910) may be configured to restore a digital image from the scanned data of an analog backup image (925) and create a digital image file having similar coloring and metadata to an original digital image file, according to the method (800, FIG. 8) described above. The restored digital image file may then be stored in the data storage (915), where it may be accessed by a user (930) of the computer (905).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An apparatus for backing up a digitally stored image comprising at least one substrate; wherein said image and digital restoration data corresponding to said digitally stored image are printed on said at least one substrate;
   said digital restoration data comprising one or more reference color patches corresponding to colors used in printing said image;
   wherein each of said reference color patches is printed in association with an identifier that identifies an original color space value of a corresponding said reference color patch.

2. A system for backing up digitally stored images, said system comprising:
   a data storage subsystem;
   a printer; and
   a computer subsystem; wherein said computer subsystem is configured to:
      retrieve at least one digitally stored image from said data storage subsystem;
      cause said printer to print said image on a desired substrate; and
      cause said printer to print digital restoration data corresponding to said digitally stored image on said substrate together with said image, said digital restoration data comprising one or more reference color patches corresponding to colors used in printing said image;
   wherein said reference color patches further comprise printed characters corresponding to original color space values of said patches.

3. A method of backing up a digitally stored image, said method comprising:
   printing said image on a desired substrate;
   printing digital restoration data corresponding to said digitally stored image on said substrate together with said image, said digital restoration data comprising one or more reference color patches corresponding to colors used in printing said image;
   scanning said substrate to obtain a scanned version of said image;
   obtaining a colorimetry of said scanned version of said image;
   scanning printed characters corresponding to original color values of said color reference patches;
   creating a transformation function from said colorimetry and said corresponding original color values; and
   using said transformation function to restore a said scanned version of said image to an original coloring of said original digital stored image.

4. An apparatus for backing up a digitally stored image comprising at least one substrate; wherein said image and digital restoration data corresponding to said digitally stored image are printed on said at least one substrate;
   said digital restoration data comprising one or more reference color patches corresponding to colors used in printing said image;
   wherein said digital restoration data further comprises and identification of a type of printer and inks used by that printer to print said image and reference color patches.

5. The method of claim 3, further comprising scanning printed metadata for an image that was printed in association with said image and electronically storing said metadata with said scanned version of said image.

* * * * *